United States Patent [19]

Tegethoff

[11] Patent Number: 4,546,216

[45] Date of Patent: Oct. 8, 1985

[54] ECHO SUPPRESSOR FOR IMPROVING ECHO CANCELER PERFORMANCE

[75] Inventor: Ronald H. Tegethoff, Tinton Falls, N.J.

[73] Assignee: AT&T Bell Laboratories, Murray Hill, N.J.

[21] Appl. No.: 461,436

[22] Filed: Jan. 27, 1983

[51] Int. Cl.$^4$ ............................................. H04B 3/20
[52] U.S. Cl. ............................... 179/170.2; 179/170.6
[58] Field of Search ................. 79/170.2, 170.6, 170.8

[56] References Cited

U.S. PATENT DOCUMENTS

| | | | |
|---|---|---|---|
| 3,754,105 | 8/1973 | Poschenrieder et al. | 179/170.2 |
| 4,005,277 | 1/1977 | Areski et al. | 179/170.2 |
| 4,282,411 | 8/1981 | Stewart | 179/170.2 |
| 4,360,712 | 11/1982 | Horna | 179/170.2 |

Primary Examiner—Gene Z. Rubinson
Assistant Examiner—R. Vaas
Attorney, Agent, or Firm—John Francis Moran; Erwin W. Pfeifle

[57] ABSTRACT

An echo suppressor (21, 22) monitors signal levels associated with the working environment of an echo canceler (16, 17) to prevent spurious transient responses from the canceler. These spurious responses typically occur before the echo canceler has had sufficient time to appropriately adapt which is also the time when a call is first established. At such times, signaling and maintenance testing are performed in a telecommunications network and the echo canceler tends to produce an output when there is no actual transmit input signal. The echo suppressor includes a comparator (26, 27) which detects the presence of this output and the absence of an actual transmit input signal and operates a switch. The switch prevents the transient echo from propagating on the transmit path.

3 Claims, 2 Drawing Figures

4,546,216

ECHO SUPPRESSOR FOR IMPROVING ECHO CANCELER PERFORMANCE

BACKGROUND OF THE INVENTION

This invention relates to echo control in communication channels and, more particularly, to the effective suppressing of echoes in a 2-way telephone circuit at the beginning of a call when the connection is first established.

Echo cancelers of the self-adaptive type are used to provide an echo replica for subtraction from the returning signal. The lower cost of echo cancelers is due to integrated circuit implementations and this has greatly increased the number of communications channels equipped with echo cancelers. In general, the performance of echo cancelers has proven to be desirable for effective elimination of the effect of echo during transmission. However, when a call is first established the echo cancelers have not had sufficient time to become appropriately adapted, also called converged, and may produce a high level spurious output signal, because it is not a true echo replica by virtue of coupling significant energy from the transmission signal back to the returning transmission path.

Subjectively this spurious echo may not actually be objectionable to users of the system due to its relatively short duration. However, other problems are caused by it. For example, during signaling such spurious responses from echo cancelers in a communication system may trigger false operation, or interfere with signaling. Also during automatic maintenance testing, the spurious echo will provide a false indication of the status of the circuits being tested.

SUMMARY OF THE INVENTION

Broadly, the invention is an arrangement for defining signaling conditions in the working environment of an echo canceler which produces spurious echo and isolates the output of the canceler from the transmission paths until the canceler is fully adapted.

In some of the aspects of the invention, a comparator is coupled to receive the input and output signal levels of the echo canceler. The comparator utilizes two prescribed levels as references in producing an output which disrupts the output of the echo canceler thereby decoupling it from the transmission path. When the input signal level is below one prescribed level and the output signal level exceeds the other prescribed level, an AND gate opens a switch connecting the output of the echo canceler to the transmission path.

BRIEF DESCRIPTION OF THE DRAWING

A more complete understanding of the invention and the various features, objects and advantages thereof may be more readily appreciated and better understood by reference to the following detailed description in conjunction with the drawing wherein.

DETAILED DESCRIPTION

Figure 1:
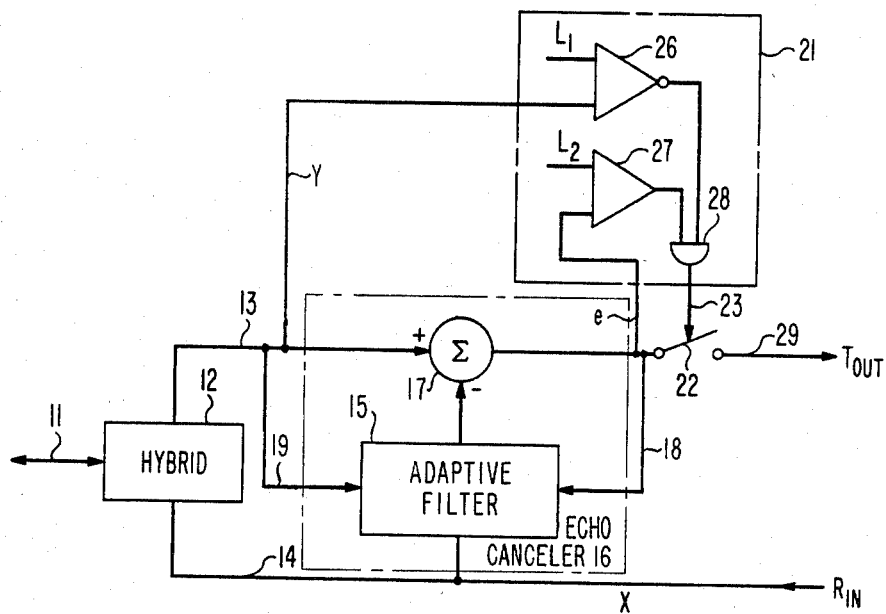
FIG. 1 is a circuit diagram of an embodiment of the invention.

FIG. 1 depicts a typical application for the invention wherein 2-wire circuit 11 is coupled through hybrid 12 to a 4-wire circuit comprising line 13 and line 14. As is well known in the art, hybrids such as hybrid 12 do not function perfectly so that received input signal energy on line 14 does not all appear on 2-wire circuit 11 by virtue of the transhybrid loss also known as leakage path which couples signal energy from line 14 to line 13. For this reason an echo canceler 16 bridges the 4-wire circuit at line 13 so that algebraic signal combiner 17, forming part of canceler 16, functions to subtract from any signal on line 13 an output signal from adaptive filter 15 of canceler 16 to reduce the effective transhybrid loss in hybrid 12 to prevent the formation of echo signals.

During normal operation of canceler 16, the output of algebraic signal combiner 17 produces an error signal which is fed into adaptive filter 15 on line 18 so that it has the correct signal information to provide the echo cancellation function. As is typical in echo cancelers, canceler 16 will most likely include a talk detector for which line 19 provides the input. The description so far has only included conventional components which are generally found in telecommunications systems for eliminating echo signals.

The remainder of the circuitry in FIG. 1 includes a signal comparator 21 which operates switch 22 via output line 23. Comparator 21 utilizes two reference signal levels, L1 and L2, which are individually applied to comparator 26 and comparator 27. The other input to comparator 26 is the 4-wire output of hybrid 12 and the other input to comparator 27 is the output of algebraic signal summer 17. The outputs of comparators 26 and 27 are logically combined by AND gate 28 to provide the output of comparator 21 on line 23. The logic of comparator 21 is such that when the signal "e" at the output of signal summer 17 is greater than level $L_2$ and the signal at "y" at the output of hybrid 12 is less than level $L_1$ switch 22 is open. For all other level combinations switch 22 is closed.

Now that all the circuitry of FIG. 1 is described, the transient phenomenon of spurious echo will be explained. Spurious echoes will typically occur within an interval of a few hundred milliseconds when an echo canceler is reconverging from one state to another. Basically, this signal phenomenon is most objectionable in two specific situations.

First, as the call is initially established or being set up, the hybrid 12 and the 2-wire line 11 are not part of the circuit because a switching machine has not yet completed the cross connection. Since the echo canceler 16 is a self-adaptive device, it has retained its setting from a previous call. Thus no signal energy appears on line 13 and the signal energy on line 14 is fed through canceler 16 and appears as an output of signal combiner 17. This condition persists until canceler 16 adapts to a zero using the error signal on line 18 and the output of signal combiner 17 is also zero. This occurs until canceler 16 is fully adapted or completely converged in accordance with the new infinite transhybrid loss. The effect of spurious echo on the telecommunications network may prevent normal signaling functions during call set up.

The second situation wherein the phenomenon of spurious echo occurs is during maintenance testing. In maintenance testing, high level signals appearing on line 14 can be coupled through echo canceler 16 via adaptive filter 15 to algebraic signal summer 17. As a result, false information on the health of circuits will be produced defeating the purpose of such testing.

It is to be understood that switch 22 is normally in the closed position and completes the signal path from line 13 to line 29. The operation of comparator 21 and switch 22 function to prevent the spurious echo signal from appearing or being coupled to line 13.

Figure 2:
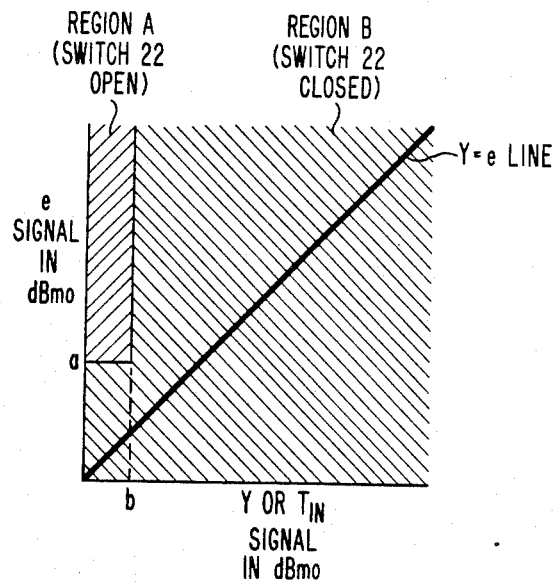
FIG. 2 is a graph depicting the operation of the invention in relation to signal levels.

This is accomplished by the application of two prescribed reference levels for comparing the input and output of algebraic signal summer 17 as illustrated graphically in FIG. 2. The graph of FIG. 2 is divided into two regions each associated with a position of switch 22. In region A, switch 22 is opened while in region B switch 22 is closed. Region A depicts the situation wherein the phenomenon of spurious echo is experienced. This occurs when the signal energy coupled from line 13 is below the level of $L_1$ or point b in FIG. 2 and the output of algebraic signal summer 17 is above the level of $L_2$ or point a in FIG. 2 by virtue of the coupling of signal energy on line 14 via echo canceler 16 to the output of the algebraic summer 17. By using the inverted output, comparator 26 will produce a logical one state with an input less than $L_1$ while comparator 27 will produce a logical one state with an input greater than $L_2$. Therefore both comparators 26 and 27 are producing a logical one level output. Responsive to this input condition, AND gate 28 produces an output to open switch 22. Accordingly, although a spurious echo is still produced by canceler 16, the signal energy does not appear on line 29 due to the opening of switch 22 which isolates the network during those occasions when canceler 16 produces an undesirable response.

FIG. 2 illustrates that when the input signal level is less than level b and the output signal level exceeds level a, switch 22 is opened to prevent the rather large spurious echo output of echo canceler 16 from propagating on transmission line 29. Typical levels for suitable operation are $-33.5$ dBmO for a and $-47$ dBmO for b.

It is to be understood that the echo suppressor described and illustrated herein is only one practical circuit realization for correcting a particular problem which occurs in a telecommunications network. For example, a more complex circuit arrangement may be devised to provide an arrangement which expands region A of FIG. 2 so that it almost borders the $y=e$ line and keeps switch 22 open for signaling conditions falling in Region A. Accordingly, numerous other embodiments and modifications may be made by those skilled in the art without departing from the spirit and scope of the invention.

What is claimed is:

1. Apparatus for preventing spurious response signals, from an echo canceler connected between a receiving signal path and a sending signal path, from propagating along the sending signal path to a remote point, the apparatus comprising:

signal comparison means connected to receive (a) a first input signal propagating in the sending signal path before the connection of the echo canceler to the sending signal path, and (b) a second input signal propagating in the sending signal path after the connection of the echo canceler to the sending signal path, the signal comparison means comprising means for (1) comparing the first input signal, propagating along the sending signal path before the interconnection thereto of the echo canceler, with a first predetermined threshold signal level, and (2) comparing the second input signal, propagating in the sending signal path after the interconnection thereto of the echo canceler, with a second predetermined threshold signal level which is different than the first predetermined threshold signal level, said signal comparison means being arranged to generate (i) a first output control signal when both the first input signal is below the first predetermined threshold signal level and the second input signal is equal to or above the second predetermined threshold signal level indicative of a spurious response signal from the echo canceler, and (ii) a second output control signal at all other times; and switching means responsive to the first output control signal from the signal comparison means for opening the sending signal path after the interconnection of the echo canceler to the sending signal path, and responsive to the second output signal from the signal comparison means for closing the sending signal path.

2. Apparatus according to claim 1 wherein the signal comparison means comprises:

a first comparator for comparing a level of the first input signal with the first predetermined threshold signal level and for generating a first output control signal when the level of said first input signal is below said first predetermined threshold signal level and a second output control signal when the level of said first input signal is equal to or above the first predetermined threshold signal level; and a second comparator for comparing a level of the second input signal with the second predetermined threshold signal level and for generating a first output control signal when said second input signal is equal to or above the second predetermined threshold signal level and a second output control signal when the second input signal is below said second predetermined threshold signal level.

3. Apparatus according to claim 2 wherein the signal comparison means further comprises:

logic means responsive to the first and second output control signals from both the first and second comparators for generating the first output control signal from the signal comparison means to the switching means for opening the sending signal path when the first and second comparators concurrently generate a first output control signal, and for generating the second output control signal to the switching means for maintaining a continuous sending signal path at all other times.

* * * * *